(12) United States Patent
Kim et al.

(10) Patent No.: US 10,997,648 B2
(45) Date of Patent: May 4, 2021

(54) SYSTEM AND METHOD OF SORTING APPARATUS CELL ALLOCATION FOR FAST E-COMMERCE ORDER FULFILLMENT

(71) Applicant: Coupang Corp., Seoul (KR)

(72) Inventors: Woong Kim, Seoul (KR); Sang Ho Yim, Seoul (KR); Sung Jin Park, Seoul (KR); Hyeon Chang Baek, Seoul (KR); Yoo Suk Kim, Seoul (KR); Hyunggeun Ji, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/276,722

(22) Filed: Feb. 15, 2019

(65) Prior Publication Data

US 2020/0265504 A1    Aug. 20, 2020

(51) Int. Cl.
*G06Q 30/06* (2012.01)
*G06F 16/25* (2019.01)
(Continued)

(52) U.S. Cl.
CPC ....... *G06Q 30/0637* (2013.01); *G06F 16/252* (2019.01); *G06F 16/288* (2019.01); *G06K 7/1417* (2013.01); *G06Q 10/087* (2013.01)

(58) Field of Classification Search
CPC .................................................. G06Q 10/087
See application file for complete search history.

(56) References Cited

U.S. PATENT DOCUMENTS 8,103,377 B1 *  1/2012  Wong .................. G06Q 10/087
                                                        700/214
9,171,278 B1 * 10/2015  Kong .................. G06Q 10/087
(Continued)

FOREIGN PATENT DOCUMENTS

CN         108564320           9/2018
JP        2010-173789           8/2010
(Continued)

OTHER PUBLICATIONS

International Search Report and Written Opinion dated Oct. 14, 2020 in PCT International Application No. PCT/IB2020/051209, 11 pages.

(Continued)

*Primary Examiner* — Florian M Zeender
*Assistant Examiner* — Whitney Poffenbarger
(74) *Attorney, Agent, or Firm* — Finnegan, Henderson, Farabow, Garrett & Dunner, LLP

(57) ABSTRACT

Methods and systems for allocating cells of a sorting apparatus include associating, in a database, an identifier of the sorting apparatus with an identifier of a first container storing a first item of the purchase order, the purchase order including a second item stored in a second container; before associating the sorting apparatus with the second container, receiving an identifier of the first item; determining, in the database using the identifier of the first item, whether any cell of the sorting apparatus is associated with the purchase order; when no cell of the sorting apparatus is associated with the purchase order, associating, in the database, an identifier of a cell of the sorting apparatus with the identifier of the purchase order; and transmitting a first signal to a computer associated with a worker instructing placement of the first item in the cell.

17 Claims, 12 Drawing Sheets

(51) Int. Cl.
    *G06K 7/14*         (2006.01)
    *G06Q 10/08*     (2012.01)
    *G06F 16/28*     (2019.01)

(56) References Cited

U.S. PATENT DOCUMENTS

| | | | |
|---|---|---|---|
| 9,174,758 B1* | 11/2015 | Rowley | B65B 59/00 |
| 9,656,805 B1* | 5/2017 | Evans | G06Q 10/087 |
| 9,714,145 B1 | 7/2017 | Lehmann | |
| 10,127,514 B2* | 11/2018 | Napoli | G06Q 10/083 |
| 2007/0150383 A1* | 6/2007 | Shakes | G06Q 10/0875 |
| | | | 705/29 |
| 2008/0167884 A1* | 7/2008 | Mountz | G06Q 10/087 |
| | | | 705/29 |
| 2013/0302132 A1* | 11/2013 | D'Andrea | G06Q 10/08 |
| | | | 414/807 |
| 2014/0374478 A1* | 12/2014 | Dearing | G06Q 10/0833 |
| | | | 235/385 |
| 2017/0124511 A1* | 5/2017 | Mueller | G06Q 10/0837 |
| 2019/0152376 A1* | 5/2019 | Schwartz | B60P 1/6481 |

FOREIGN PATENT DOCUMENTS

| | | |
|---|---|---|
| JP | 2012-131590 | 7/2012 |
| JP | 2014-002705 | 1/2014 |
| JP | 2014-218318 | 11/2014 |
| TW | I615337 A | 12/2016 |

OTHER PUBLICATIONS

Search Report dated Sep. 4, 2020, from the Taiwan Intellectual Patent Office related to Taiwan Application No. 109104738, 1 page.
Australian Examination Report dated Nov. 18, 2020 for Application No. 2020222347 (6 pages).

* cited by examiner

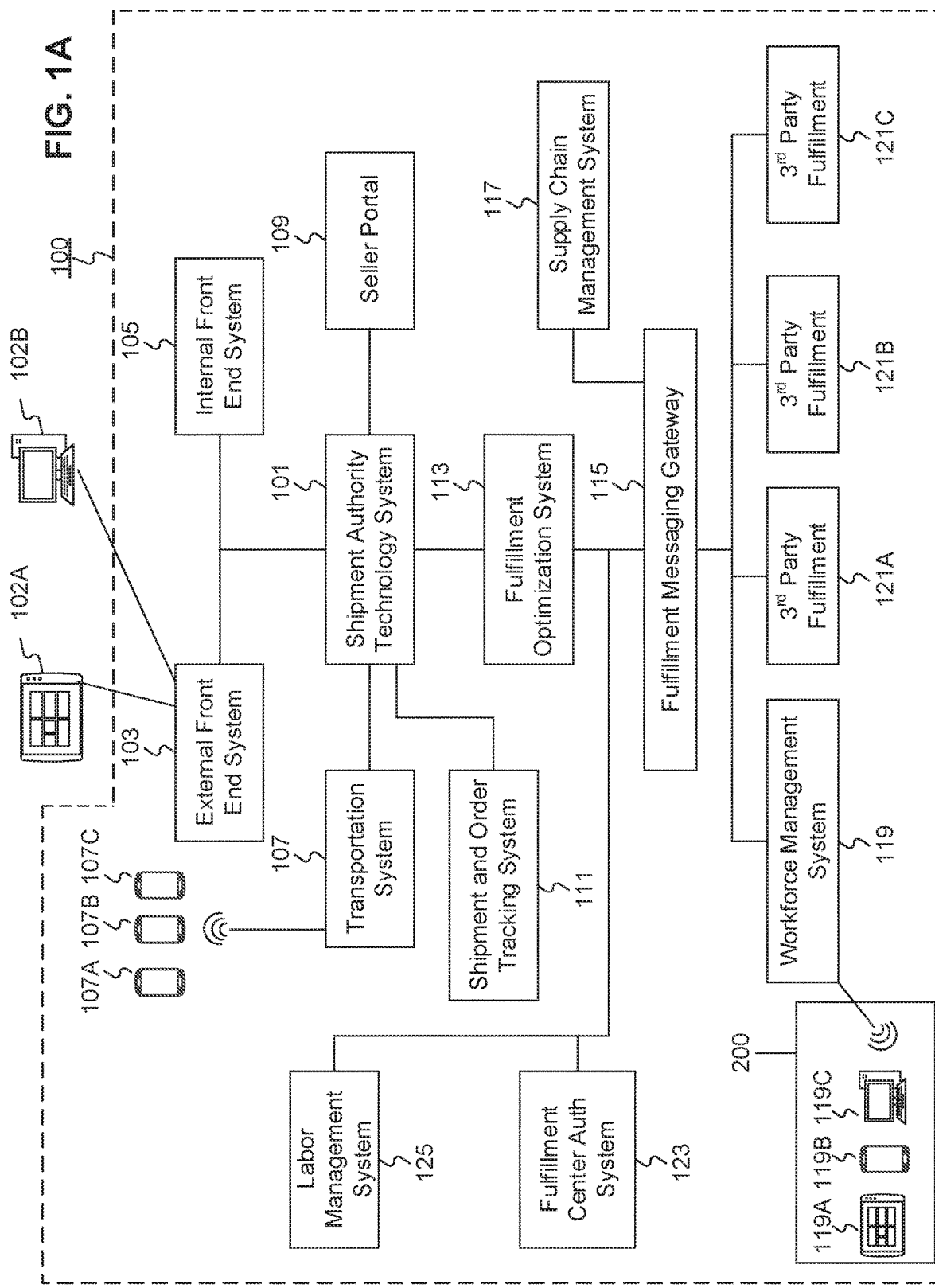

SYSTEM AND METHOD OF SORTING APPARATUS CELL ALLOCATION FOR FAST E-COMMERCE ORDER FULFILLMENT

TECHNICAL FIELD

The present disclosure generally relates to computerized systems and methods for cell allocation of sorting apparatus. In particular, embodiments of the present disclosure relate to inventive and unconventional systems relate to cell allocation of sorting apparatus for fast e-commerce order fulfillment.

BACKGROUND

Online shopping is popular nowadays. Electronic commerce (or "e-commerce") merchants strive to improve user experience by minimizing the period for order fulfillment, timed from an order being placed to a package of the order being delivered to the purchaser. One time-consuming portion of the fulfillment process is sorting the items of different orders in fulfillment facilities (e.g., warehouses), because merchandise items are usually inventoried by classifications in fulfillment facilities while purchase orders may include any combination of any kind of items.

Sorting apparatuses may be used to sort the items in the fulfilment facilities. A sorting apparatus typically includes a frame and multiple divided unit spaces (or "cells"). Each of the cells may be assigned to one purchase order. The sorting apparatus may be integrated in a larger fulfilment computer system. Typically, items of multiple orders (referred to as an "order batch") are retrieved together from inventories and transported to a location of the sorting apparatus. Items of the order batch may be transported from the inventories to the sorter in separate containers, such that items belonging to one order may be in multiple containers. A sorting worker (or a "sorter") may check the transported items, one by one, and put it into its allocated cell. When all items of the purchase order are put into its allocated cell, a packing worker (or a "packer") may pack them for delivery.

Typically, cells of the sorting apparatus may be randomly or nearly randomly allocated to respective orders for active sorting, and a cell is only released for the next allocation when all items in the order are received and are sent for packing. However, the problem of "inactive cells" is a challenge for current sorting apparatuses and systems. In conventional systems, cells may be occupied by items of an unfinished order for a long time. To reduce inactive occupancy of the cells of the sorting apparatus, the systems do not instruct the sorter to start sorting items for an order until all containers loaded with all items of that order are confirmed to have arrived. Otherwise, a cell may become inactive for a long time, which can reduce the throughput of the computing system for sorting. As a result, the containers would pile up and the fulfillment efficiency would drop. Such conventional processes or algorithms thus decrease the fulfillment efficiency itself because items in transported containers cannot be sorted in real time.

Another challenge in the conventional processes or algorithms is that different orders have different total weights of items and the cells are assigned to the orders without considering such. Conventional algorithms or systems may assign orders having a heavy total weight is assigned to a cell high in the sorting apparatus, which is difficult or even dangerous for the workers to handle. These conventional processes and algorithms do not account for these conditions, which can be a source of delay, breakage, and other inefficiencies. Therefore, there is a need for better cell allocation for the sorting apparatus.

SUMMARY

One aspect of the present disclosure is directed to a method including operations performed by a computer processor for allocating cells of a sorting apparatus, each of the cells for receiving items associated with a purchase order. The method comprises: associating, in a database, an identifier of the sorting apparatus with an identifier of a first container storing a first item of the purchase order, the purchase order comprising a second item stored in a second container; prior to associating the sorting apparatus with the second container, receiving an identifier of the first item; determining, in the database using the identifier of the first item, whether any cell of the sorting apparatus is associated with the purchase order; upon determining that no cell of the sorting apparatus is associated with the purchase order, associating, in the database, an identifier of a cell of the sorting apparatus with the identifier of the purchase order; and transmitting a first signal to a computer associated with a worker, the first signal instructing placement of the first item in the cell.

Another aspect of the present disclosure is directed to a non-transitory computer-readable storage medium that comprises instructions for allocating cells of a sorting apparatus, each of the cells for receiving items associated with a purchase order. The instructions, when executed by a processor, become operational with the processor to: associate, in a database, an identifier of the sorting apparatus with an identifier of a first container storing a first item of a purchase order, wherein the purchase order comprises a second item stored in a second container; prior to associating the sorting apparatus with the second container, receive an identifier of the first item; determine, in the database using the identifier of the first item, whether any cell of the sorting apparatus is associated with the purchase order; upon determining that no cell of the sorting apparatus is associated with the purchase order, associate, in the database, a cell of the sorting apparatus with the purchase order; and transmit a first signal to a computer associated with a worker, the first signal instructing placement of placing the first item in the cell.

Yet another aspect of the present disclosure is directed to a system for allocating cells of a sorting apparatus. The system comprises: a sorting apparatus that comprises a first row and a second row of one or more adjustable cells; a computing device that is associated with the sorting apparatus and comprises a scanning device configured to receive at least one of a barcode, a quick response (QR) code, or a radio-frequency identification (RFID) signal; and a computer that is coupled to the sorting apparatus using a network. The computer comprises a database, a memory storing instructions, and at least one processor configured to execute the instructions to: receive, from the computing device, an identifier of a first container storing a first item of a purchase order, wherein the purchase order comprises a second item stored in a second container; associate, in the database, an identifier of the sorting apparatus with an identifier of the identifier of the first container; prior to associating the sorting apparatus with the second container, receive an identifier of the first item from the computing device; determine, in the database using the identifier of the first item, whether any cell of the sorting apparatus is associated with the purchase order; upon determining that no cell of the sorting apparatus is associated with the purchase order, associate, in the database, an identifier of a cell of the sorting apparatus with an identifier of the purchase order; transmit a first signal to the computing device instructing placement of the first item in the cell; receive, from the computing device, an identifier of the second container; associate, in the database, the identifier of the sorting apparatus with an identifier of the second container; receive an identifier of the second item from the computing device; determine, in the database using the identifier of the second item, whether any cell of the sorting apparatus is associated with the purchase order; and upon determining that the cell is associated with the purchase order, transmit a second signal to the computer device instructing placement of the second item in the cell.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for cell allocation for a sorting apparatus. According to the disclosed embodiments herein, a system can perform a process that automatically allocate a cell on a sorting apparatus for an order to enable a sorter to start sorting items of the order without waiting to confirm arrivals of all items of that order. If the order occupies a cell of the sorting apparatus and becomes inactive for a certain period of time, the system may automatically split the order into separate packages for shipping and release the cell for sorting of another order. Doing so may increase the throughput, parallel processing capability, and data processing efficiency of the computing system, reduce the time spent on sorting items of each order, and improve the utilization rate of the sorting apparatus and e-commerce order flow rates.

According to the disclosed embodiments herein, the system may also factor in a total weight of all items of the order in the process of allocating the cell for that order. If the order has a heavy total weight, the system may assign a cell near the bottom of the sorting apparatus to the order. If the order has a light total weight, the system may assign a cell near the top of the sorting apparatus to the order. Doing so may improve algorithms, procedures, and processes of placing items, and reduce safety hazards for the sorters and the packers to perform tasks.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
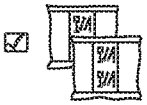
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102b) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
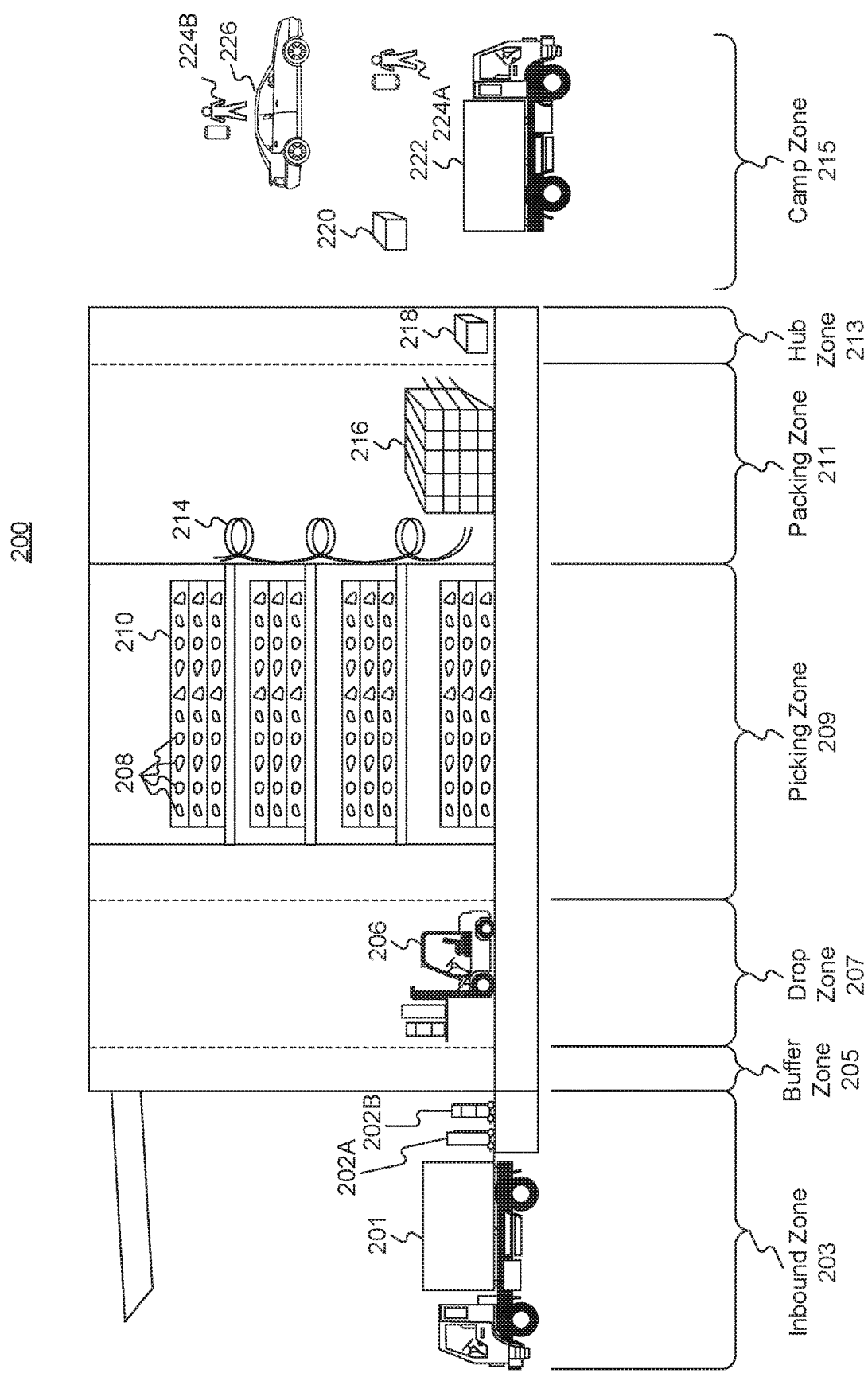
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119 6.

Once a user places an order, a picker may receive an instruction on device 119 6 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

In some embodiments, the sorting of items of orders may be implemented in FC 200. For example, the sorting may be implemented in packing zone 211 using the sorting apparatus 216.

Figure 3:
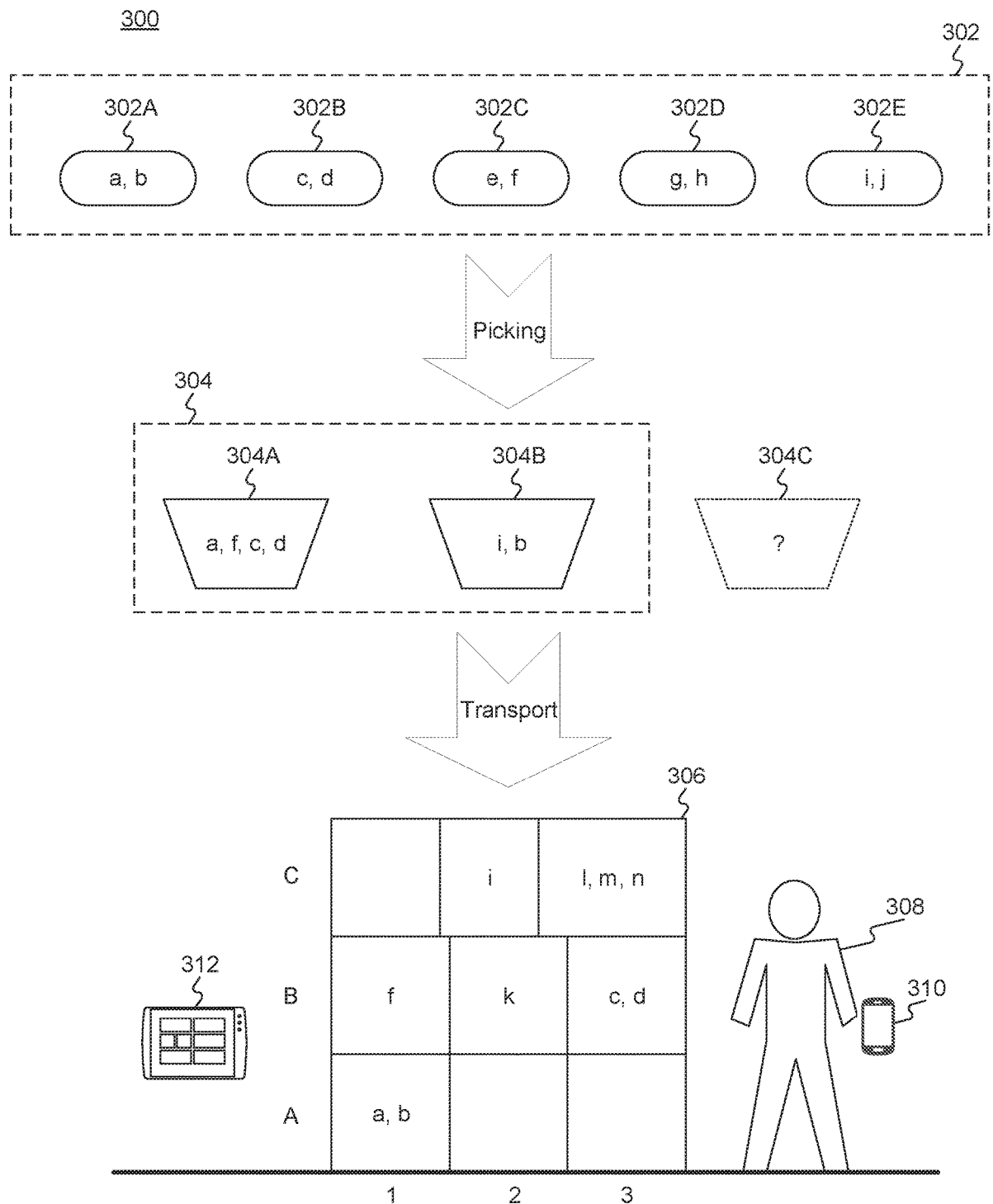
FIG. 3 is a diagrammatic illustration of an example process of sorting items of purchase orders using a sorting apparatus, consistent with the disclosed embodiments.

FIG. 3 is a diagrammatic illustration of an example process 300 of sorting items of purchase orders using a sorting apparatus, consistent with the disclosed embodiments. FIG. 3 depicts process 300, which includes order batch 302, container set 304, container 304C, and sorting apparatus 306. Order batch 302, in some embodiments, represents a collection of orders assigned to one or more workers for picking from storage units 210 (in FIG. 2). Order batch may include orders 302A-302E. Container set 304, in some embodiments, represents a collection of containers. Here, container set 304 includes containers 304A and 304B and excludes container 304C. Sorter 308 works at the site of sorting apparatus 306, using computers 310 and 312. In some embodiments, computers 310 and 312 may be any of computers 119A-119C in FIG. 2. In FIG. 3, sorter 308 is depicted as an individual. However, it should be noted that sorter 308 may be implemented as a machine and not limited to the examples described herein. For ease of explanation without causing ambiguity, sorter 308 is described as an individual hereinafter unless specifically stated otherwise.

In some embodiments, users, such as customers, of system 100 may place purchase orders (e.g., using mobile device 102A or computer 102B) through external front end system 103. An order batch may be generated for a fulfillment center (e.g., FC 200). In FIG. 3, order batch 302 includes multiple orders, such as orders 302A-302E. As shown, orders 302A-302E include items a and b, c and d, e and f, g and h, and i and j, respectively. In some embodiments, one or more items included in order batch 302 may be stored in storage units 210 in picking zone 209. When orders 302A-302E are placed, a picker may receive an instruction to retrieve items al from the storage units 210 and place them into multiple containers (e.g., boxes, totes, carts, buckets, or any kind of any suitable physical container for loading items). In some embodiments, the containers may be transported to the sorting apparatus 216 using transport mechanism 214.

In FIG. 3, one or more items of the order batch 302 are placed in a container set 304 that includes containers 304A and 304B. A "container set" herein may comprise a collection, set, or group of containers. As shown in FIG. 3, the items are put into the containers not necessarily in accordance with the orders they belong to. For example, a picking worker may retrieve items based on proximity to that worker (e.g., as directed by a mobile device instructing the picking worker which items to pick). Items a, f, c, and d are loaded into container 304A. Items i and b are loaded into container 304B. This could happen when items a, f, c, and d are retrieved from a first storage unit (e.g., a shelf), and items i and b are retrieved from a second storage unit that is located distantly from the first storage unit (e.g., on another floor of FC 200). It should be noted that containers 304A-304C may be loaded with other items belonging to other purchase orders (not shown), not limited to items of order batch 302. Container set 304 is to be transported to sorting apparatus 306 using transport mechanism 214. Sorter 308 may sort items in the transported containers into sorting apparatus 306. In some embodiments, sorter 308 may be an individual, such as a sorting worker. In some embodiments, sorter 308 may be a computer-operated machine. It should be noted that, when being transported to the sorting apparatus, the containers in container set 304 may not be transported in a sequential manner. That is, containers 304A and 304B may arrive at sorting apparatus 306 one after another or arrive with an arbitrary number of other containers arriving between them.

In some embodiments, items e, g, h, and j may also be stowed at FC 200 but loaded in other containers. When containers 304A and 304B arrive at sorting apparatus 306, sorter 308 does not know immediately how many other containers the items of order batch 302 are loaded into and when will they arrive at sorting apparatus 306. They may be in container 304C, which may arrive soon. They may be in another container, which may arrive later. In some situations, items e, g, h, and j may be out of stock at FC 200 and may not arrive at sorting apparatus 306, or may arrive much later than expected.

In some embodiments, sorting apparatus 306 may be a shelf-, rack-, or wall-like apparatus. In FIG. 3, sorting apparatus 306 may be referred to as a "rebin wall," which includes a rectangular space enclosed by a frame and divided into sub-spaces or cells. Sorting apparatus 306 is divided into three rows A, B, and C, from bottom up, and three columns 1, 2, and 3, from left to right. Sorting apparatus 306 is divided into 9 cells, referred to as cells A1, A2, A3, B1, . . . , C3. It should be noted that sorting apparatus 306 is an example illustration and is not limited to the shown configurations. In some embodiments, sorting apparatus 306 may include any number of rows, and each row may include any number of cells. In some embodiments, the sizes of the cells of sorting apparatus 306 are adjustable to accommodate different sizes of items in different orders. For example, as shown in FIG. 3, sizes of cells C1-C3 are adjusted to be different from those of cells A1-A3 and B1-B3. Cell C3 is enlarged to accommodate a large order that includes items l, m, n. In some embodiments, the sizes of the cells may be adjusted by sorter 308. In some embodiments, the sizes of the cells may be adjusted automatically, such as by a computer-operated device associated with sorting apparatus 306. It should be noted that sorting apparatus 306 is only an example and methods, configurations, and implementations of size adjustment of the cells of the sorting apparatus are not limited to the examples illustrated herein.

When containers 304A and 304B arrive at sorting apparatus 306, in conventional sorting processes, sorter 308 may start sorting items of orders 302A and 302B because containers that include all items thereof (i.e., containers 304A and 304B) have arrived. However, sorter 308 would typically confirm the arrival of containers that include items e, g, h, and j before starting sorting items of orders 302C-302E. Such waiting may decrease fulfillment efficiency. Also, sorter 308 would typically let cells (e.g., cells B1, B2, and C2 in FIG. 3) be occupied until all items of corresponding orders have been placed into them, which may increase inactive occupancy of sorting apparatus 306.

According to embodiments disclosed herein, when containers 304A and 304B arrive at sorting apparatus 306, the sorter may start sorting items of orders 302C-302C and 302E and do not need to confirm the arrival of items e, g, h, and j before starting sorting. For example, sorter 308 may use a computer 310 to obtain (e.g., by scanning or tagging) an identifier (e.g., a barcode or an RFID) of item a in container 304A. In some embodiments, computer 310 may be a mobile device, such as computer 119B. In some embodiments, computer 310 may transmit the identifier of the item to another computer (WMS 119 in FIG. 2), which will determine or allocate cell A1 of sorting apparatus 306 for order 302A. Cell A1 may be indicated to a computer associated with sorter 308 via a signal, and sorter 308 may put item a to cell A1 according to the indication. The indication to sorter 308 may be any combination of a visual indicator (e.g., an icon, a text, or a blinking screen), an acoustic indicator (e.g., a beep, a voice, or a ring), or a tactile indicator (e.g., a vibration). In some embodiments, the computer associated with sorter 308 may be computer 312, computer 310, or a combination thereof. Computer 312 may also be used for other fulfillment-related purposes, such as displaying a website (e.g., as shown in external front end system 103 or internal front end system 105), a purchase order summary, or guidelines for work procedures.

In some embodiments, when all items of an order have been put into its allocated cell, sorter 308 may be indicated that the corresponding orders are completed. For example, sorter 308 may be indicated that order 302A is completed when items a and b have been put into cells A1. As another example, sorter 308 may be indicated that order 302B is completed when items c and d have been put into cells B3. In some embodiments, sorter 308 may further indicate a packer to start packing the completed orders. The packers may take items out of the cells associated with the completed orders, after which those cells (e.g., cells A1 and B3) become available again for allocation. For example, sorter 308 and the packer may stand on both sides of sorting apparatus 306, such that sorter 308 may put items into the cells on one side and the packer may retrieve the items from the cells on the opposite side.

In some embodiments, a computer system such as computer 310 or 312, connected to a computer system (e.g., WMS 119) in system 100, may automatically notify the packer of complete orders by a visual or optical indicator associated with the cell, such as, for example, a light bulb or a light-emitting diode (LED). For example, in some embodiments, each cell of sorting apparatus 306 may correspond to one or more LEDs on sorting apparatus 306. The LEDs may be configured to automatically light up to notify the packer when an order is completed upon receipt of a communication from a computer (e.g., WMS 119). In some embodiments, the visual indicator may be installed on both sides of the cells for notifying both sorters and packers that some order has been completed. In some embodiments, the visual indicator may be color-coded (e.g., white for "incomplete" and green for "completed"). It should be noted that any number of any color may be used for the color-coded visual indicator and not limited to the examples as described herein.

In some embodiments, if a cell has been inactive for a long time (e.g., the inactive period exceeds a predetermined value) but the order associated with that cell has not been completed, an operator may be notified. In some embodiments, the operator may be a supervisor of sorter 308. In some embodiments, the operator may be a computer (not shown) associated or assigned to the supervisor of sorter 308.

In some embodiments, sorter 308 may notify the operator (e.g., by pressing a report button on computer 310 or 312). For another example, a visual indicator (e.g., a light bulb, an LED on sorting apparatus 306, or an element on a display screen) may be automatically triggered to notify the operator. The visual indicators may also be color-coded, each indicative of different statuses of a cell. For example, an LED may light white for "incomplete," green for "completed," grey for "canceled for shipment," and red for "inactive." (Any number of any color may be used for the color-coded visual indicator and the embodiments are not limited to these examples.)

The operator (e.g., a supervisor or WMS 119) may make different decisions in response to the occurrence of inactive cells. For example, the order associated with an inactive cell may be marked as "partially complete" or "split," and a packer may be indicated to start packing the sorted items of the order for delivery. The remaining items of the order will be sent out in a later, separate package. As another example, an operator may cancel shipping of the order if too few items have been sorted at the expiration of a time period. In some embodiments, such decisions depend on various factors, such as, for example, the time a cell having been inactive for, the PDDs associated with the orders, the number of split packages of the same order, a time gap between arrivals of items, an occupancy rate (i.e., the percentage of occupied cells) of the sorting apparatus, remaining containers on the transport mechanism 214, workload of the fulfillment center, and/or workload and schedules of the sorters and packers.

According to the disclosed embodiments herein, a sorter may start sorting an order without waiting to confirm arrivals of all items of that order. If an order occupies a cell of the sorting apparatus and becomes inactive for a certain period of time, it may be automatically split into separate packages for shipping. Doing so may increase the throughput, parallel processing capability, and data processing efficiency of the computing system, reduce the time spent on sorting items of each order, and improve the utilization rate of the sorting apparatus and e-commerce order flow rates.

In some embodiments, a total weight of the items of the order may be considered before allocating a cell for that order. For example, if order 302A has a heavy total weight, items a and b may be assigned to cell A1 that is near the bottom of sorting apparatus 306. For another example, if order 302E has a light total weight, items i and j may be assigned to cell C2 that is near the top of sorting apparatus 306. Doing so may improve algorithms, procedures, and processes of placing items, and reduce safety hazards for the sorters and the packers to perform tasks.

Figure 4:
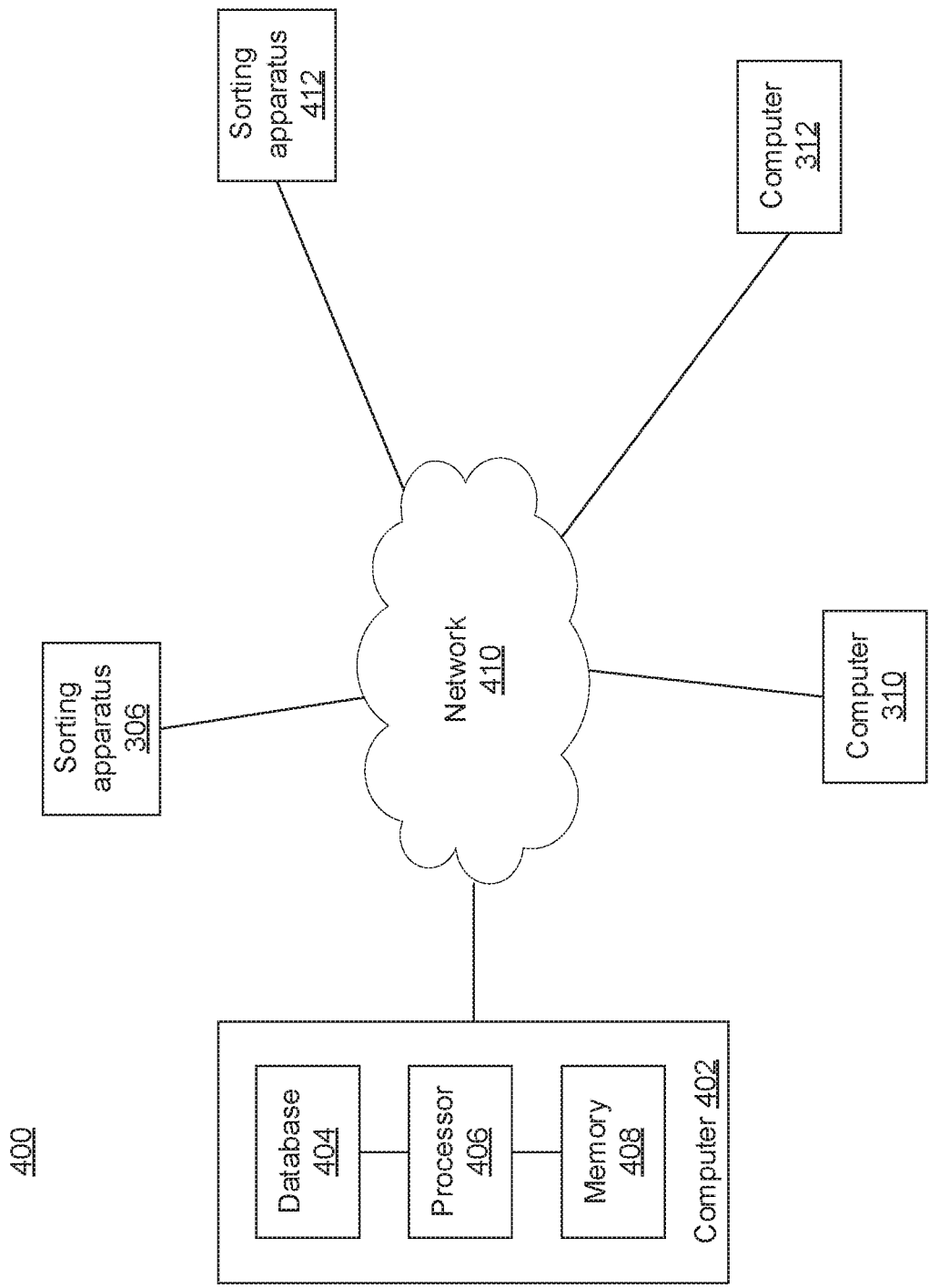
FIG. 4 is a diagrammatic illustration of an example system for allocating cells of a sorting apparatus, consistent with the disclosed embodiments.

FIG. 4 is a diagrammatic illustration of an example system 400 for allocating cells of a sorting apparatus, consistent with the disclosed embodiments. The system 400 includes at least one computer (e.g., computers 402, 310, and 312) and at least one sorting apparatus. The at least one sorting apparatus may be coupled to computer 402 using network 410. For example, computer 402 may be implemented as WMS 119; computers 310 and 312 may be one or more of computers 119A, 119B, and 119C; and sorting apparatus 412 may be implemented in a manner similar to sorting apparatus 306 (described above with respect to FIG. 3). Computer 402 may be coupled to at least one other computers (e.g., computers 310 and 312) using network 410. In some embodiments, network 410 may be implemented as described above with respect to system 100 (in FIG. 1A).

Computers in system 400 (e.g., computers 402, 310, and 312) may be implemented as any combination of any number of any type of computers, such as a microcomputer, a mainframe computer, a supercomputer, a general-purpose computer, a special-purpose computer, an integrated/embedded computer, a server computer, a personal computer, a laptop computer, a tablet computer, a cell phone, a personal data assistant (PDA), a wearable computing device, or a cloud computer. The computers in system 400 may also be implemented as virtual computers that include multiple computers located at different geographic locations interconnected using a network (e.g., network 410).

Computer 402 includes database 404, processor 406, and memory 408. Memory 408 may store instructions that may be executed by processor 406 to implement processes or procedures for cell allocation of a sorting apparatus. Database 404 may be implemented as any form of a collection of structured data stored in one or more local or remote computers or a distributed computer system and accessible to other computers.

Processor 406 may be a generic or specific electronic device capable of manipulating or processing information. For example, processor 406 may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor 406 may also be a virtual processor that includes one or more processors distributed across multiple machines or devices coupled via a network (e.g., network 410).

Memory 408 may be a generic or specific electronic device capable of storing codes and data accessible by processor 406 (e.g., via a bus, not shown). For example, memory 408 may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. Memory 408 may also be a virtual memory that includes one or more memories distributed across multiple machines or devices coupled via a network (e.g., network 410).

Network 410 may be one or more public or private communication network. For example, network 410 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

In some embodiments, computer 402 may associate sorter 308, computer 310, and sorting apparatus 306 with one another as follows. For example, a sorter 308 may log into computer 310 and, using a scanning device, scan an identifier associated with sorting apparatus 306 (e.g., a barcode). Computer 310 may then send the scanned identifier, along with an identifier of sorter 308 (e.g., a user identifier) and an identifier of computer 310, to computer 402. Computer 402 may then generate a relational data record indicative of such an association between sorter 308, computer 310, and sorting apparatus 306 in database 404. Such an association may represent that computer 310 is being used by sorter 308 to work at sorting apparatus 306.

Methods, apparatuses, and systems for cell allocation of a sorting apparatus implemented according to this disclosure are described below in detail in connection to FIGS. 5-8 as follows. In FIGS. 5-8, processes 500, 600A, 600B, 700, and 800 may be implemented as software or firmware, such as program codes or instructions, stored in a computer-readable storage medium. The program codes or instructions may be read and executed by a processor to implement processes 500, 600A, 600B, 700, and 800. For example, the computer-readable storage medium may be memory 408, and the processor may be processor 406. In some embodiments, the processes 500, 600A, 600B, 700, and 800 may be implemented as special-purpose hardware, such as a PLA, a PAL, a GAL, a CPLD, an FPGA, a SoC, or an ASIC. Processes 500, 600A, 600B, 700, and 800 may be implemented as algorithms programmed into the special-purpose hardware that may perform the operations specified by the algorithms. In some embodiments, the aforementioned processes may be implemented as a combination of the above-mentioned software and hardware.

Figure 5:
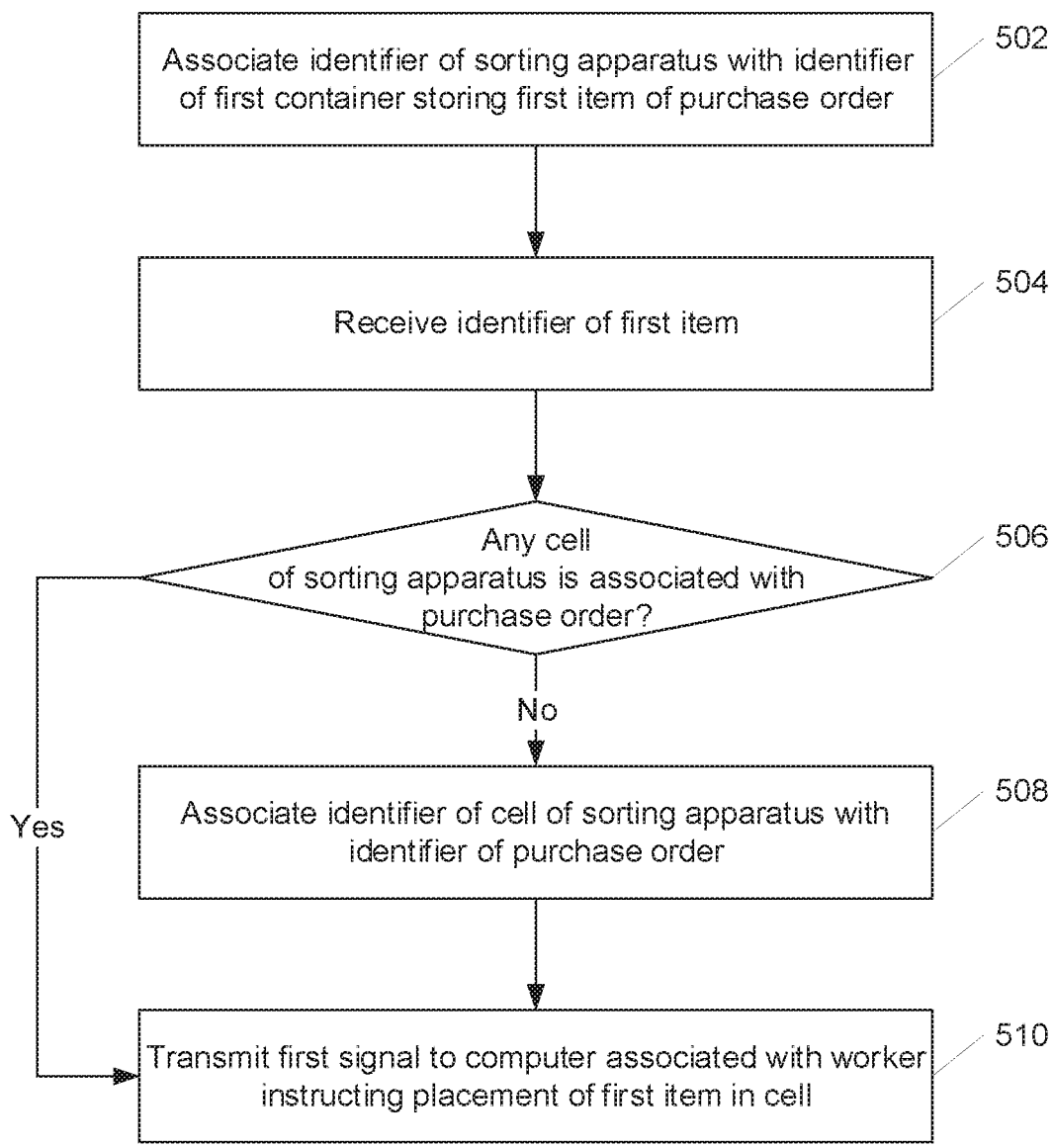
FIG. 5 is a flowchart of a first example process for cell allocation of a sorting apparatus, consistent with the disclosed embodiments.

FIG. 5 is a flowchart of an example process 500 for cell allocation of a sorting apparatus, consistent with the disclosed embodiments. In some embodiments, the sorting apparatus may be a rebin wall, such as sorting apparatus 306 in FIG. 3. The sorting apparatus may include multiple cells. Each of the cells may be configured to receive items of a purchase order.

In step 502, processor 406 of computer 402 associates an identifier of the sorting apparatus with an identifier of a first container in database 404 of computer 402. For example, step 502 may comprise generating a database entry (e.g., a relational data record) associating an identifier of sorting apparatus 306 with an identifier of container 304A in database 404. In some embodiments, the data entry may directly associate the identifiers, such as by including the identifier of sorting apparatus 306 and the identifier of container 304A in the same relational data record. In some embodiments, the data entry may indirectly associate the identifiers, such as by including the identifier of sorting apparatus 306 in a first relational data record and including the identifier of container 304A in a second relational data record, in which the first relational data record and the second relational data record are associated with data other than the identifier of sorting apparatus 306 and the identifier of container 304A. The purchase order also includes a second item that is stored in a second container. For example, order 302A also includes item b that is stored in container 304B. Such an association between the sorting apparatus and the first container may represent that items in the first container will be sorted using the sorting apparatus.

In some embodiments, the database may include relational data (e.g., a table) indicative of relationships between data items. A data item may include data (e.g., identifiers) representing purchase orders, order batches, sorting apparatuses, cells of sorting apparatuses, containers, container sets, items, fulfillment center personnel (e.g., sorters, packers, managers), computers (e.g., computers 310 and 312), locations, and any other fulfillment-related resources. The relationships between the data items may be implemented as a data format representing an association thereof, such as a row or a column in a table, or key-value pairs. The identifiers may represent a unique identification of an object. The identifiers herein may include barcodes, quick response (QR) codes, or radio-frequency identification (RFID) tags. The association of objects herein may refer to an association of identifiers of the objects which is stored as one or more relational data records in the database. For example, the association may be stored as a relational data record comprising an identifier of the sorting apparatus and an identifier of the first container.

In some embodiments, as part of or before step 502, the processor associates a computing device with a worker and the sorting apparatus in the database. For example, processor 406 may associate computer 310 with sorter 308 and sorting apparatus 306 in database 404. The computing device may be equipped with identification devices configured to receive package identifiers. For example, the identifiers may include one or more barcodes (one- or two-dimensional), QR codes, pictures, RFID tags, or the like. Computer 310 may be equipped with include any combination of any number of a barcode scanner, a QR code scanner, a camera, or an RFID reader. Such an association between the computing device, the worker, and the sorting apparatus may represent that the worker is using the computing device to work at the sorting apparatus.

In order to associate computer 310 with a sorter, a user may log in computer 310 using credentials, such as a username and a password, or an RFID card. In some embodiments, once the login succeeds, computer 310 may send an identifier of sorter 308 along with other data (e.g., an identifier of the computing device, time and location of the login) to computer 402 via network 410. After receiving the data, computer 402 may generate a relational data record indicative of such an association between computer 310 and sorter 308 in database 404.

For another example, a user (e.g., sorter 308) may use computer 310 to obtain an identifier of sorting apparatus 306, such as by scanning a barcode or a QR code of sorting apparatus 306, by reading an RFID tag of sorting apparatus 306, or the like. The identifier of sorting apparatus 306 may be sent along with other data (e.g., the identifier of the computing device, the identifier of the worker, or time and location of such operation) to computer 402 via network 410. After receiving the data, computer 402 may generate a relational data record indicative of such an association between computer 310 and sorting apparatus 306 in database 404.

For another example, a user (e.g., sorter 308) may use computer 310 to obtain an identifier of sorting apparatus 306 after successfully logging in to computer 310. Computer 402 may receive data from computer 310 via network 410, including the identifiers of sorter 308, computer 310, and sorting apparatus 306, based on which computer 402 can generate a relational data record indicative of such association between sorter 308, computer 310, and sorting apparatus 306 in database 404.

Referring back to step 502, in some embodiments, processor 406 receives the identifier of container 304A from computer 310. The worker may obtain the identifier of the first container using the computing device. For example, sorter 308 may obtain a barcode, a QR code, or an RFID tag of container 304A using computer 310. Computer 310 may send the identifier of container 304A along with other data (e.g., the identifier of computer 310, and/or time and location of such operation) to the computer via the network.

In some embodiments, as part of step 502, processor 406 may associate an identifier of sorting apparatus 306 with the identifier of container 304A in database 404. In some embodiments, after receiving the identifier of the first container and the other data, computer 402 may generate a relational data record indicative of an association between the identifier of the first container and the identifier of the sorting apparatus.

Referring back to FIG. 5, at step 504, processor 406 receives an identifier of the first item. For example, sorter 308 may obtain the identifier (e.g., a barcode, a QR code, or an RFID tag) of item a using computer 310. Computer 310 may send the identifier of the first item along with other data (e.g., the identifier of the computing device, and/or time and location of such operation) to computer 402 via network 410. Operation 504 is performed prior to associating the sorting apparatus with the second container. That is, the sorting for order 302A may be started before confirmation of arrival of the container 304B that includes item b.

At step 506, processor 406 determines whether any cell of sorting apparatus 306 is associated with order 302A. In some embodiments, the identifier of the first item may be used as a key to search in the database for an identifier of the purchase order. The identifier of the purchase order may be used as a key to search in the database for an association with an identifier of a cell of the sorting apparatus.

If no cell of the sorting apparatus is associated with the purchase order, process 500 proceeds to step 508. Otherwise, process 500 proceeds to step 510, where the found associated cell is indicated to the worker.

At step 508, processor 406 associates a cell of the sorting apparatus with the purchase order in the database. For example, processor 406 may select (or "assign") cell A1 from available cells of sorting apparatus 306 for order 302A and associate an identifier (e.g., a text "A1") of cell A1 and the identifier of order 302A in database 404, such as by generating a database entry (e.g., a relational data record).

At step 510, processor 406 transmits a signal to a computer associated with a worker, and the signal instructs placement of the first item in the cell. For example, processor 406 may transmit the signal to computer 312 associated with sorter 308 indicative of placing item a in cell A1. For another example, processor 406 may transmit the signal to computer 310 associated with sorter 308. For example, processor 406 may transmit the signal to both computers 310 and 312. In some embodiments, processor 406 may transmit the signal via network 410 to computer 312, which is associated with sorter 308 and sorting apparatus 306.

In some embodiments, after transmitting the signal to computer 312, computer 312 may generate an indicator for presentation to the worker for placing the first item in the cell. The indicator may be any combination of any number of a visual indicator (e.g., an icon, a text, or a blinking screen), an acoustic indicator (e.g., a beep, a voice, or a ring), or a tactile indicator (e.g., a vibration). Computer 312 may generate the indicator using the signal. For example, after receiving the signal, computer 312 may display a text "A1" on its screen to indicate sorter 308 that item a should be put in cell A1.

Figure 6A:
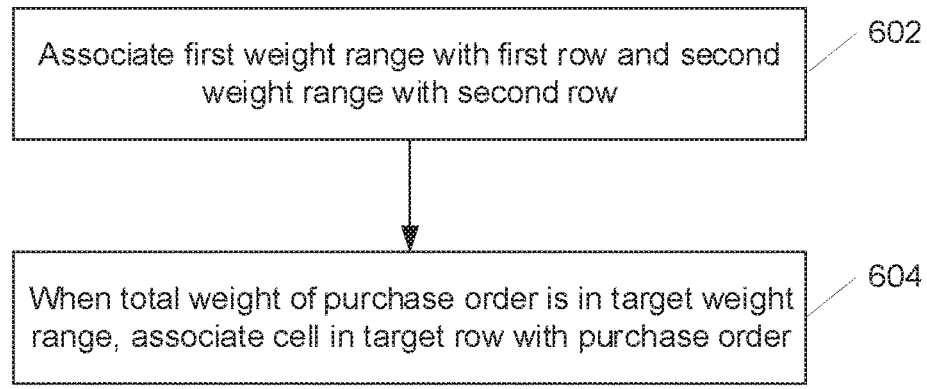
FIG. 6A is a flowchart of an example process for weight-based cell allocation of a sorting apparatus, consistent with the disclosed embodiments.

FIG. 6A is a flowchart of an example process 600A for weight-based cell allocation of a sorting apparatus, consistent with the disclosed embodiments. In some embodiments, the total weight of items of a purchase order may be considered as a factor in determining which cell to assign to the purchase order. In some embodiments, process 600A represent operations performed as part of step 508 in FIG. 5. In some embodiments, the sorting apparatus (e.g., sorting apparatus 306) may include a first row (e.g., row A) of cells and a second row (e.g., row B) of cells.

At step 602, processor 406 associates, in database 404, a first weight range with the first row and a second weight range with the second row. For example, processor 406 may associate (e.g., by generating a first database entry) the first weight range with the first row and associate (e.g., by generating a second database entry) the second weight range with the second row. The smallest value of the first weight range is greater than or equal to the largest value of the second weight range. The first row is located below the second row in the sorting apparatus. For example, row A may be associated with a first weight range (more than or equal to 40 pounds and less than 50 pounds), and row B may be associated with a second weight range (more than or equal to 30 pounds and less than 40 pounds).

At step 604, if processor 406 determines that total weight of items of the purchase order is in a target weight range, the processor associates a cell in a target row with the purchase order. For example, processor 406 may associate (e.g., by generating a database entry) an identifier of the cell in the target row with the identifier of the purchase order in database 404. The target row is associated with the target weight range that is either the first weight range or the second weight range. In some embodiments, the total weight of the purchase order may be determined by adding individual weights of the items of the purchase order. The individual weights of the items may be retrieved from the database (e.g., database 404). For example, if the total weight of items a and b of order 302A is 45 lbs., the target weight range is the first weight range (i.e., between 40 pounds and 50 pounds), and the target row is row A. Based on such information, cell A1 is associated with (or "assigned to") order 302A. That is, all items of order 302A will be put in cell A1 by sorter 308.

Figure 6B:
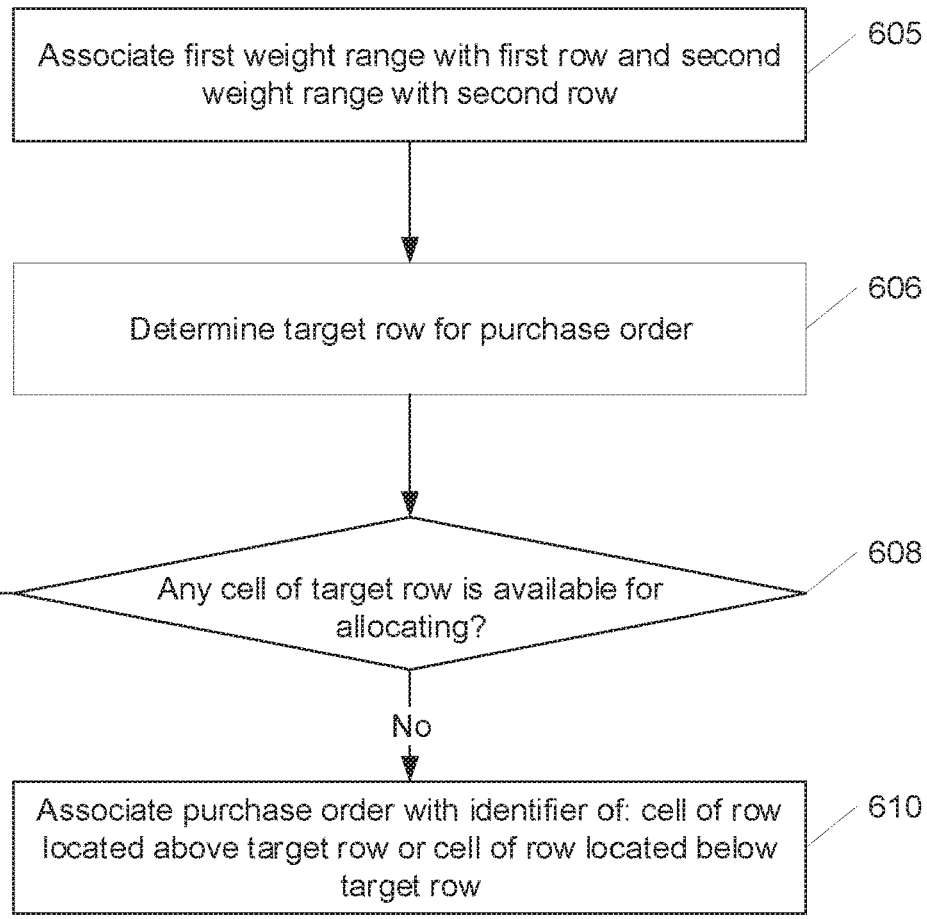
FIG. 6B is a flowchart of another example process for weight-based cell allocation of a sorting apparatus, consistent with the disclosed embodiments.

FIG. 6B is a flowchart of another example process 600B for weight-based cell allocation of a sorting apparatus, consistent with the disclosed embodiments. In some embodiments, process 600B may be implemented as an example embodiment of step 508. In certain situations, the processor may determine a target row, but no cell of the target row is available for allocating. In those situations, a row located above or below the target row may be determined for cell allocation; process 600B may be used in these situations.

In FIG. 6B, step 605 may be implemented in a manner similar to step 602 in FIG. 6A (described above).

At step 606, processor 406 determines a target row for the purchase order. Total weight of items of the purchase order is in a target weight range associated with the target row. In some embodiments, the target weight range may be the first weight range or the second weight range. For example, for order 302E that includes items i and j, the total weight of order 302E may be 35 lbs., falling in the second weight range (i.e., between 30 pounds and 40). Processor 406 may determine row B as the target row. In some embodiments, some rows of the sorting apparatus may be associated with one or more weight ranges that have no limit (e.g., any weight less than 10 lbs., or any weight greater than 100 lbs.), in which any purchase order may be guaranteed to be assigned to a target row based on its weight.

At step 608, processor 406 determines whether any cell of the target row associated with the target weight range is available for allocating. In the same example as at step 606, processor 406 may determine whether any cell of row B is available for allocating, which is none, as shown in FIG. 3. If the processor determines that no cell of the target row is available for allocating, process 600B proceeds to step 610. Otherwise, process 600B proceeds to step 604.

At step 610, processor 406 associates the purchase order with one of: a cell of a row located below the target row or a cell of a row located below the target row. In the same example as at step 608, no cell of row B is available for allocating, and processor 406 may associate order 302E with a cell of row C (located above row B) or a cell of row A (located below row B). In some embodiments, processor 406 may randomly select the cell to be associated with order 302E from a row above or below row B. In some embodiments, processor 406 may select the cell associated with order 302E from the first row having available cells above row B. In some embodiments, processor 406 may select the cell associated with order 302E from the first row having available cells below row B.

In some embodiments, the association in step 610 may be determined based on an occupancy rate of the sorting apparatus. For example, when the occupancy rate is less than 50% (e.g., less than 5 of the 9 cells of sorting apparatus 306 are occupied), processor 406 may determine the cell associated with order 302E to be in a row randomly above or below the target row. When the occupancy rate is equal to or more than 50% (e.g., more than 4 of the 9 cells are occupied), processor 406 may determine the cell associated with order 302E to be from the first row having available cells below (or above) the target row.

It may be seen that in processes 600A and 600B, a total weight of the items of the order may be considered before allocating a cell for that order. By assigning purchase orders with a heavier total weight and a lighter total weight to cells in a lower row and in a higher row, respectively, algorithms, procedures, and processes of placing items may be improved, and the sorters and the packers may face less difficulty and safety hazards.

Figure 7:
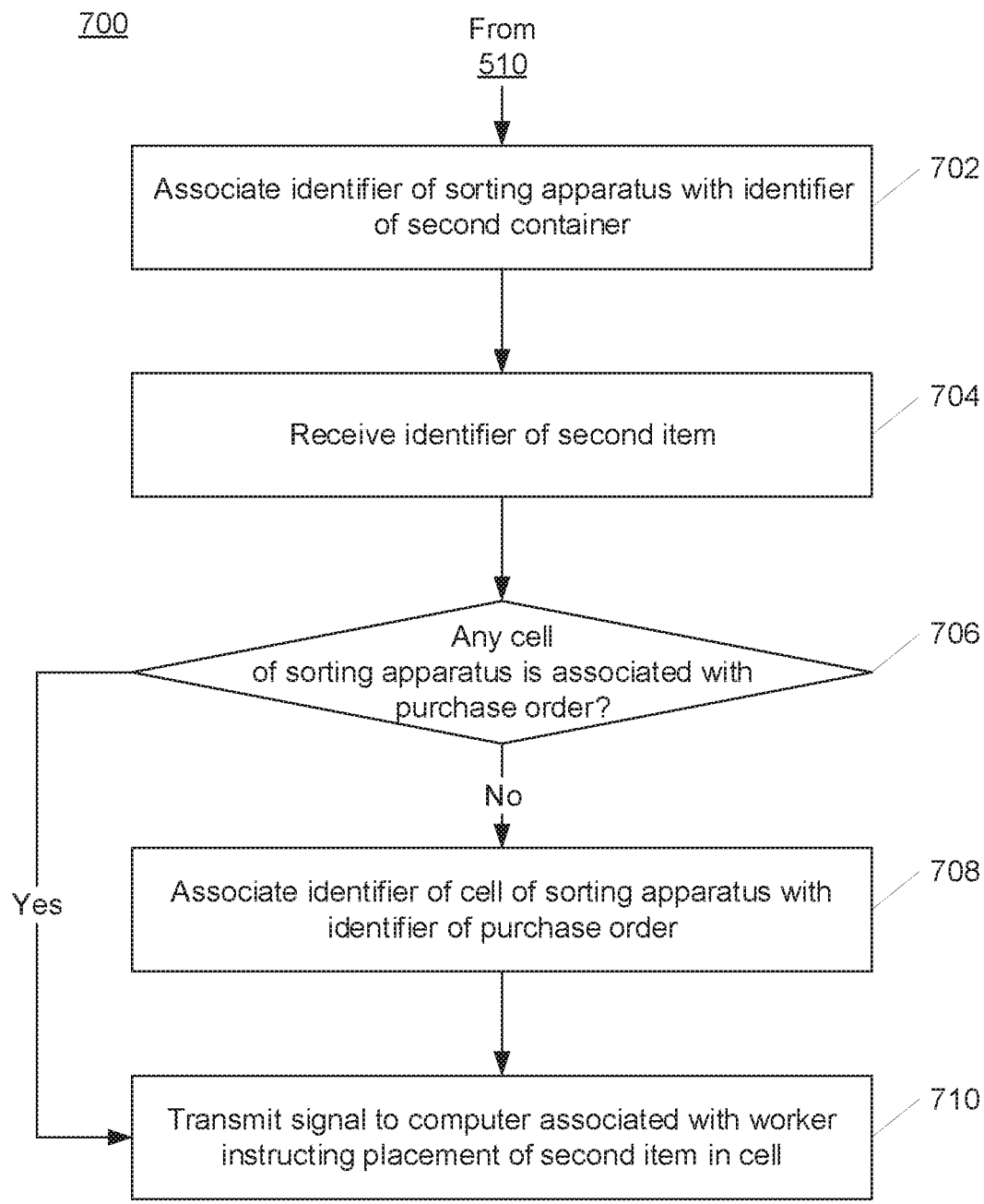
FIG. 7 is a flowchart of another example process for cell allocation of a sorting apparatus, consistent with the disclosed embodiments.

FIG. 7 is a flowchart of an example process 700 for cell allocation of a sorting apparatus, consistent with the disclosed embodiments. In some embodiments, process 700 may be implemented as a process following step 510 of process 500. In some embodiments, process 700 may be performed in parallel process with process 500. For example, processor 406 may be capable of multi-threaded processing, enabling processes 500 and 700 to operate simultaneously or substantially simultaneously. In some embodiments, process 700 may be performed after step 510 occurs, i.e., when a first item of the purchase order has been put into the allocated cell. In other words, the sorting of the purchase order may be started before confirming the arrival of all containers that include all items of the purchase order. Doing so may increase the throughput, parallel processing capability, and data processing efficiency of the computing system, reduce the time spent on sorting items of each order, and improve the utilization rate of the sorting apparatus and e-commerce order flow rates.

At step 702, processor 406 associates the sorting apparatus with the second container in the database. The association of the second container with the sorting apparatus may be similar to the association of the first container with the sorting apparatus at step 502. For example, processor 406 may associate sorting apparatus 306 with container 304B in database 404. In some embodiments, step 702 may be performed when sorter 308 starts sorting items (e.g., any of items i or b) in container 304B.

At step 704, processor 406 receives an identifier of the second item. For example, processor 406 may receive an identifier of item b. The receiving of the identifier of the second item may be implemented in a manner similar to the receiving of the identifier of the first item at step 504 (for example, sorter 308 receiving the identifier of item a using computer 310).

At step 706, processor 406 determines whether any cell of the sorting apparatus is associated with the purchase order. For example, the identifier of item b may be used as a key to search in database 404 for the identifier of order 302A. The identifier of order 302A may be used as a key to search in database 404 for an identifier of allocated cell A1 of sorting apparatus 306. Operation 706 may be implemented in a manner similar to step 506.

If no cell of the sorting apparatus is associated with the purchase order, process 700 proceeds to step 708. This may happen when the purchase order has been split for shipping while the second item is being handled. In that situation, a first package that includes the first item of the purchase order has been packed. The originally allocated cell is released for sorting other purchase orders, and thus no longer available. If a cell is found to be associated with the purchase order, such as the cell where the first item is put, process 700 proceeds to step 710, where the found associated cell is indicated to the worker.

At step 708, processor 406 associates a cell of the sorting apparatus with the purchase order in the database. Operation 708 may be implemented in a manner similar to step 508 of process 500 (for example, processor 406 associating the identifier of cell A1 and the identifier of order 302A in database 404).

At step 710, processor 406 transmits a signal to the computer associated with the worker, and the signal is indicative of placing the second item in the cell. For example, processor 406 may transmit a signal to computer 312 (or computer 310, or both) associated with sorter 308, in which the signal is indicative of placing item b in cell A1. Operation 710 may be implemented in a manner similar to step 510 of process 500.

Figure 8:
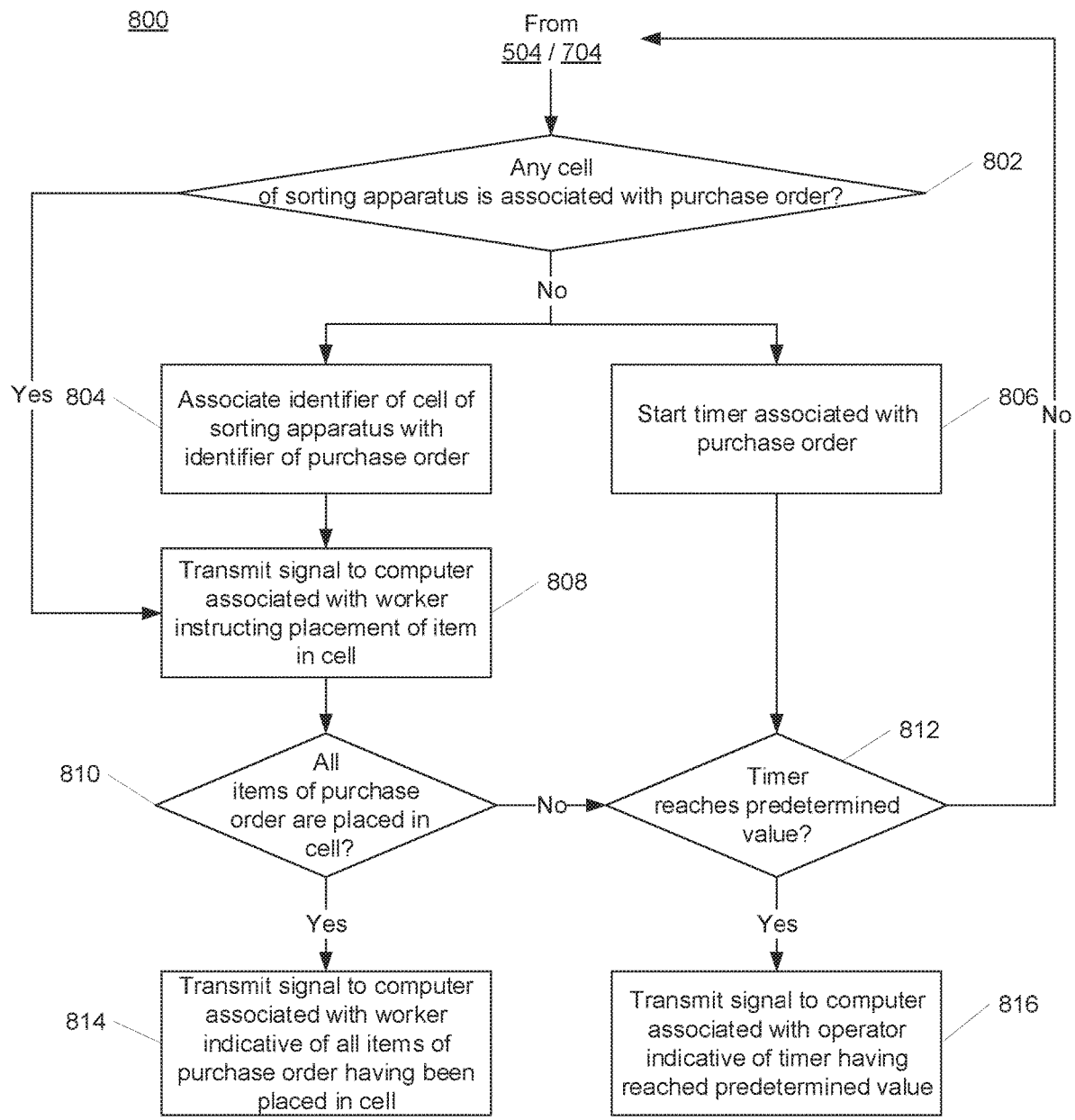
FIG. 8 is a flowchart of an example process for sorting items of a purchase order, consistent with the disclosed embodiments.

FIG. 8 is a flowchart of an example process 800 for sorting items of a purchase order, consistent with the disclosed embodiments. In some embodiments, process 800 may be implemented as software or firmware. In some embodiments, process 800 may be performed by processor 406 as a parallel process of process 500 or 700. For example, processor 406 may be capable of multi-threaded processing, enabling processes 500, 700, and 800 to operate simultaneously or substantially simultaneously. In some embodiments, process 800 may be implemented as a process following step 504 of process 500 and/or a process following step 704 of process 700.

At step 802, processor 406 determines whether any cell of the sorting apparatus is associated with the purchase order. For example, when sorting order 302C, processor 406 may determine whether any cell of sorting apparatus 306 is associated with order 302C. Step 802 may be implemented in a manner similar to step 506 of process 500 or step 706 of process 700 (for example, processor 406 may determine whether any cell of sorting apparatus 306 is associated with order 302A).

If no cell of the sorting apparatus is associated with the purchase order, process 800 proceeds to operations 804 and 806. Otherwise, process 800 proceeds to step 808, where the found associated cell is indicated to the worker.

At step 804, processor 406 associates the cell of the sorting apparatus with the purchase order. For example, processor 406 may associate an identifier of cell B1 with an identifier of order 302C, such as by generating a database entry. Operation 804 may be similar to step 508 of process 500 or step 708 of process 700 (for example, processor 406 associating the identifier of cell A1 and the identifier of order 302A in database 404).

At step 806, substantially simultaneously with step 804, processor 406 starts a timer associated with the purchase order. The timer may be used to record how much time has been spent on sorting the associated purchase order. For example, processor 406 may start the timer associated with order 302C when sorter 308 starts sorting the first item (e.g., item f) of the order.

At step 808, processor 406 transmits a signal to the computer associated with the worker, and the signal is indicative of placing the item in the cell. For example, processor 406 may transmit a signal to computer 312 associated with sorter 308, in which the signal is indicative of placing item f in cell B1. Operation 808 may be implemented in a manner similar to step 510 of process 500 or step 710 of process 700.

At step 810, processor 406 determines whether all items of the purchase order are placed in the cell. That is, it is determined whether the sorting of the purchase order is completed (referred to as a "completed order"). For example, processor 406 may determine whether all items e and f of order 302C are placed in cell B1. If the sorting of the purchase order is completed, process 800 proceeds to step 814. Otherwise, process 800 proceeds to step 812.

At step 814, processor 406 transmits a signal to the computer (e.g., computer 310 or 312) associated with the worker, and the signal is indicative of all items of the purchase order having been placed in the cell. For example, as shown in FIG. 3, order 302B is completed before order 302C, and processor 406 may transmit the signal to indicate sorter 308 that order 302B is completed. Sorter 308 may further indicate a packer to pack items c and d in cell B3, after which cell B3 may become available again for sorting other orders. In some embodiments, such transmission of the signal may be automatically triggered by the system 400.

At step 812, the processor determines whether the timer reaches a predetermined value (e.g., 30 minutes). That indicates the cell has been inactive for a time period equal to the predetermined value, but the order associated with that cell has not been completed. If the timer reaches the predetermined value, process 800 proceeds to step 816. Otherwise, process 800 goes back to either step 504 or step 04. It should be noted that the predetermined value may be set according to various conditions of the fulfillment center and workload of the personnel and should not be limited to the examples as described herein.

At step 816, processor 406 transmits a signal to a computer associated with an operator, and the signal is indicative of the timer associated with the purchase order having reached the predetermined value. In some embodiments, the operator may be a supervisor of sorter 308. In some embodiments, the operator may be a computer program or function operating on WMS 119. The operator (e.g., the supervisor or WMS 119) may decide whether to split or cancel shipping for the purchase order. For example, if order 302C has not been completed when the timer has reached the predetermined value (i.e., item e has not been handled by sorter 308 within the predetermined value), the operator may decide to split ship order 302C (i.e., sending item f first then item e later in a separate package). The operator may also decide to wait longer, such as to wait 10 more minutes for item e to arrive. The operator may also decide to cancel shipping or order 302C.

In some embodiments, such a decision may also be made by a computer (e.g., computer 402) in consideration of various factors, including but not limited to the time a cell having been inactive for, the PDDs associated with the orders, the number of split packages of the purchase order, a time gap between packing of the split packages, an occupancy rate of the sorting apparatus (i.e., the percentage of occupied cells), remaining containers on the transport mechanism 214, workload of the fulfillment center, and/or workload and schedules of the sorters and packers.

While the present disclosure has been shown and described with reference to particular embodiments thereof, it will be understood that the present disclosure may be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects may also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules may be created using any of the techniques known to one skilled in the art or may be designed in connection with existing software. For example, program sections or program modules may be designed in or by means of .Net Framework, .Net Compact Framework (and related languages, such as Visual Basic, C, etc.), Java, C++, Objective-C, HTML, HTML/AJAX combinations, XML, or HTML with included Java applets.

may Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method comprising operations performed by a computer processor for allocating cells of a sorting apparatus, each of the cells for receiving items associated with a first purchase order and a second purchase order, the method comprising:

associating, in a database, an identifier of the sorting apparatus with an identifier of a first container storing a first item of the first purchase order and a third item of the second purchase order, the first purchase order comprising a second item stored in a second container and the second purchase order comprising a fourth item stored in the second container;

prior to associating the sorting apparatus with the second container, receiving an identifier of the first item;

determining, in the database using the identifier of the first item, whether any cell of the sorting apparatus is associated with the first purchase order;

upon determining that no cell of the sorting apparatus is associated with the first purchase order, associating, in the database, an identifier of a cell of the sorting apparatus with an identifier of the first purchase order;

based on associating the identifier of the cell with the identifier of the first purchase order, starting a timer associated with the first purchase order;

transmitting a first signal to a first computer associated with a worker, the first signal instructing placement of the first item in the cell;

associating, in the database, the identifier of the sorting apparatus with an identifier of the second container;

based on a determination that the timer reaches a predetermined value, transmitting a second signal to a second computer associated with an operator, wherein the second signal is indicative of the timer associated with the first purchase order having reached the predetermined value; and based on the second signal, instructing the operator to perform one of splitting the first purchase order or cancelling the first purchase order.

2. The method of claim 1, wherein the sorting apparatus comprises a first row of cells and a second row of cells, and associating the identifier of the cell of the sorting apparatus with the identifier of the first purchase order comprises:

associating, in the database, a first weight range with the first row and a second weight range with the second row, wherein a smallest value of the first weight range is greater than or equal to a largest value of the second weight range, and the first row is located below the second row in the sorting apparatus; and based on a determination that a total weight of items of the first purchase order is in a target weight range, associating an identifier of a cell in a target row with the identifier of the first purchase order, wherein the target weight range is one of the first weight range and the second weight range, and the target row is associated with the target weight range in the database.

3. The method of claim 2, further comprising:

based on the determination that the total weight is in the target weight range and no cell of the target row is available for allocating, associating the identifier of the first purchase order with an identifier of one of: a cell of a row located below the target row or a cell of a row located above the target row.

4. The method of claim 1, wherein associating the identifier of the sorting apparatus with the identifier of the first container comprises:
  associating, in the database, a computing device with the worker and the sorting apparatus;
  receiving the identifier of the first container by the processor from a scanning device coupled to the computing device; and
  associating, in the database, the identifier of the sorting apparatus with the identifier of the first container.

5. The method of claim 4, wherein receiving the identifier of the first item comprises receiving the identifier of the first item from the scanning device coupled to the computing device.

6. The method of claim 1, further comprising:
  generating, based on the first signal, at least one of a visual indicator, an acoustic indicator, or a tactile indicator by one of the computer or the sorting apparatus.

7. The method of claim 1, further comprising:
  generating, based on the second signal, at least one of a visual indicator, an acoustic indicator, or a tactile indicator by one of the computer associated with the operator or the sorting apparatus to indicate that the timer associated with the first purchase order has reached the predetermined value.

8. The method of claim 1, further comprising:
  receiving, by the processor, an identifier of the second item;
  determining, in the database using the identifier of the second item, whether any cell of the sorting apparatus is associated with the first purchase order; and
  upon determining that the cell is associated with the first purchase order, transmitting a third signal to the computer associated with the worker, the third signal instructing placement of the second item in the cell.

9. The method of claim 1, further comprising:
  based on a determination that all items of the first purchase order are placed in the cell, transmitting a fourth signal to the computer associated with the worker indicative of all items of the first purchase order having been placed in the cell.

10. The method of claim 1, wherein the computer is coupled to the sorting apparatus using a network.

11. A non-transitory computer-readable storage medium, comprising instructions for allocating cells of a sorting apparatus, each of the cells for receiving items associated with a first purchase order and a second purchase order, which instructions, when executed by a processor, become operational with the processor to:
  associate, in a database, an identifier of the sorting apparatus with an identifier of a first container storing a first item of the first purchase order and a third item of the second purchase order, wherein the first purchase order comprises a second item stored in a second container and the second purchase order comprising a fourth item stored in the second container;
  prior to associating the sorting apparatus with the second container, receive an identifier of the first item;
  determine, in the database using the identifier of the first item, whether any cell of the sorting apparatus is associated with the first purchase order;
  upon determining that no cell of the sorting apparatus is associated with the first purchase order, associate, in the database, an identifier of a cell of the sorting apparatus with an identifier of the first purchase order;
  based on associating the identifier of the cell with the identifier of the first purchase order, start a timer associated with the first purchase order;
  transmit a first signal to a first computer associated with a worker, the first signal instructing placement of placing the first item in the cell;
  associate, in the database, the identifier of the sorting apparatus with an identifier of the second container;
  based on a determination that the timer reaches a predetermined value, transmit a second signal to a second computer associated with an operator, wherein the second signal is indicative of the timer associated with the first purchase order having reached the predetermined value; and
  based on the second signal, instructing the operator to perform one of splitting the first purchase order or cancelling the first purchase order.

12. The non-transitory computer-readable storage medium of claim 11, wherein the sorting apparatus comprises a first row of cells and a second row of cells, and the instructions operational with the processor to associate the cell of the sorting apparatus with the first purchase order further comprise instructions which when executed by the processor become operational with the processor to:
  associate, in the database, a first weight range with the first row and a second weight range with the second row, wherein a smallest value of the first weight range is greater than or equal to a largest value of the second weight range, and the first row is located below the second row in the sorting apparatus; and
  based on a determination that a total weight of items of the first purchase order is in a target weight range, associate an identifier of a cell in a target row with the identifier of the first purchase order, wherein the target weight range is one of the first weight range and the second weight range, and the target row is associated with the target weight range in the database.

13. The non-transitory computer-readable storage medium of claim 12, further comprising instructions which when executed by the processor become operational with the processor to:
  based on the determination that the total weight is in the target weight range and no cell of the target row is available for allocating, associate the identifier of the first purchase order with an identifier of one of: a cell of a row located below the target row or a cell of a row located above the target row.

14. The non-transitory computer-readable storage medium of claim 11, wherein the instructions operational with the processor to associate the sorting apparatus with the first container further comprise instructions which when executed by the processor become operational with the processor to:
  associate, in the database, a computing device with the worker and the sorting apparatus;
  receive the identifier of the first container from a scanning device coupled to the computing device; and
  associate, in the database, the identifier of the sorting apparatus with the identifier of the first container.

15. The non-transitory computer-readable storage medium of claim 11, further comprising instructions which when executed by the processor become operational with the processor to:

receive an identifier of the second item;
determine, in the database using the identifier of the second item, whether any cell of the sorting apparatus is associated with the first purchase order; and
upon determining that the cell is associated with the first purchase order, transmit a third signal to the computer associated with the worker indicative of placing the second item in the cell.

16. A system for allocating cells of a sorting apparatus, comprising:
a sorting apparatus, comprising a first row and a second row of one or more adjustable cells;
a first computing device, associated with the sorting apparatus and associated with a worker, the first computing device comprising a scanning device configured to receive at least one of a barcode, a quick response (QR) code, or a radio-frequency identification (RFID) signal; and
a computer, coupled to the sorting apparatus using a network, comprising:
a database;
a memory storing instructions; and
at least one processor configured to execute the instructions to:
receive, from the first computing device, an identifier of a first container storing a first item of a first purchase order and a third item of the second purchase order, wherein the first purchase order comprises a second item stored in a second container and the second purchase order comprising a fourth item stored in the second container;
associate, in the database, an identifier of the sorting apparatus with an identifier of the first container;
prior to associating the sorting apparatus with the second container, receive an identifier of the first item from the computing device;
determine, in the database using the identifier of the first item, whether any cell of the sorting apparatus is associated with the first purchase order;
upon determining that no cell of the sorting apparatus is associated with the first purchase order, associate, in the database, an identifier of a cell of the sorting apparatus with an identifier of the first purchase order;
based on associating the identifier of the cell with the identifier of the first purchase order, start a timer associated with the first purchase order;
transmit a first signal to the first computing device instructing placement of the first item in the cell;
receive, from the first computing device, an identifier of the second container;
associate, in the database, the identifier of the sorting apparatus with an identifier of the second container;
receive an identifier of the second item from the computing device;
determine, in the database using the identifier of the second item, whether any cell of the sorting apparatus is associated with the first purchase order;
upon determining that the cell is associated with the first purchase order, transmit a second signal to the computer device instructing placement of the second item in the cell;
based on a determination that the timer reaches a predetermined value, transmit a third signal to a second computer associated with an operator, wherein the third signal is indicative of the timer associated with the first purchase order having reached the predetermined value; and
based on the second signal, instructing the operator to perform one of splitting the first purchase order or cancelling the first purchase order.

17. The system of claim 16, wherein the at least one processor configured to execute the instructions to associate the cell of the sorting apparatus with the first purchase order is further configured to:
associate, in the database, a first weight range with the first row and a second weight range with the second row, wherein a smallest value of the first weight range is greater than or equal to a largest value of the second weight range, and the first row is located below the second row in the sorting apparatus;
determine a target row for the first purchase order, wherein a total weight of items of the first purchase order is in a target weight range associated with the target row, and the target weight range is one of the first weight range and the second weight range;
based on a determination that a cell of the target row is available for allocating, associate an identifier of the cell in the target row with the identifier of the first purchase order; and
based on a determination that no cell of the target row is available for allocating, associate the identifier of the first purchase order with an identifier of one of: a cell of a row located below the target row or a cell of a row located above the target row.

* * * * *